(12) United States Patent
Natori et al.

(10) Patent No.: US 10,476,405 B2
(45) Date of Patent: Nov. 12, 2019

(54) ELEMENT AND ELECTRIC GENERATOR

(71) Applicants: Junichiro Natori, Kanagawa (JP);
Tsuneaki Kondoh, Kanagawa (JP);
Tomoaki Sugawara, Kanagawa (JP);
Yuko Arizumi, Kanagawa (JP);
Takahiro Imai, Tokyo (JP); Mizuki Otagiri, Kanagawa (JP)

(72) Inventors: Junichiro Natori, Kanagawa (JP);
Tsuneaki Kondoh, Kanagawa (JP);
Tomoaki Sugawara, Kanagawa (JP);
Yuko Arizumi, Kanagawa (JP);
Takahiro Imai, Tokyo (JP); Mizuki Otagiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 105 days.

(21) Appl. No.: 15/555,244

(22) PCT Filed: Feb. 3, 2016

(86) PCT No.: PCT/JP2016/000572
§ 371 (c)(1),
(2) Date: Sep. 1, 2017

(87) PCT Pub. No.: WO2016/143251
PCT Pub. Date: Sep. 15, 2016

(65) Prior Publication Data
US 2018/0054141 A1    Feb. 22, 2018

(30) Foreign Application Priority Data

Mar. 9, 2015   (JP) .................................. 2015-045489
Oct. 20, 2015  (JP) .................................. 2015-206044

(51) Int. Cl.
*H02N 1/08* (2006.01)
*B32B 15/08* (2006.01)
(Continued)

(52) U.S. Cl.
CPC ................. *H02N 1/08* (2013.01); *B32B 3/08* (2013.01); *B32B 3/10* (2013.01); *B32B 5/022* (2013.01);
(Continued)

(58) Field of Classification Search
CPC .......... H02N 1/08; B32B 15/08; B32B 25/20; B32B 27/283
See application file for complete search history.

(56) References Cited

U.S. PATENT DOCUMENTS 4,826,616 A   5/1989  Tanino et al.
9,152,109 B2  10/2015 Sugawara et al.
(Continued)

FOREIGN PATENT DOCUMENTS

JP   2008-227541 A   9/2008
JP   2009-227985     10/2009
(Continued)

OTHER PUBLICATIONS

Machine Translation of JP 2014207867 (Year: 2019).*
(Continued)

*Primary Examiner* — Michael M Dollinger
(74) *Attorney, Agent, or Firm* — Oblon, McClelland, Maier & Neustadt, L.L.P.

(57) ABSTRACT

An element including: a first electrode; an intermediate layer; and a second electrode, the first electrode, the intermediate layer, and the second electrode being disposed in this order, the intermediate layer including an organic polymer material, where a molecular structure of the organic polymer material includes a structure represented by the following formula (1) where $R_1$ is a carbonyl group, an ether group, a thioether group, or organopolysiloxane, and $R_1$ may form a cyclic structure (an imide group) with $R_2$; and $R_2$ to (Continued)

$R_6$ are organic groups that may be identical or different, where each of the organic groups may have a valency of 2 or more and may form another structure:

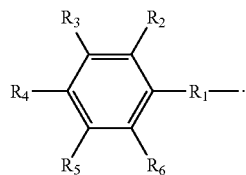

Formula (1)

15 Claims, 2 Drawing Sheets (51) Int. Cl.

| | |
|---|---|
| C08J 3/24 | (2006.01) |
| B32B 15/04 | (2006.01) |
| B32B 27/06 | (2006.01) |
| B32B 27/28 | (2006.01) |
| B32B 27/08 | (2006.01) |
| B32B 27/12 | (2006.01) |
| B32B 3/08 | (2006.01) |
| B32B 3/10 | (2006.01) |
| B32B 5/02 | (2006.01) |
| B32B 5/06 | (2006.01) |
| B32B 15/02 | (2006.01) |
| B32B 15/06 | (2006.01) |
| B32B 15/20 | (2006.01) |
| B32B 25/02 | (2006.01) |
| B32B 25/08 | (2006.01) |
| B32B 25/10 | (2006.01) |
| B32B 27/14 | (2006.01) |
| B32B 27/16 | (2006.01) |
| C08G 77/04 | (2006.01) |
| C08G 77/38 | (2006.01) |
| C08J 3/28 | (2006.01) |
| H02N 1/04 | (2006.01) |
| H02N 2/18 | (2006.01) |
| B32B 7/05 | (2019.01) |
| C08G 77/00 | (2006.01) |

(52) U.S. Cl.
CPC .............. *B32B 5/024* (2013.01); *B32B 5/028* (2013.01); *B32B 5/06* (2013.01); *B32B 7/05* (2019.01); *B32B 15/02* (2013.01); *B32B 15/04* (2013.01); *B32B 15/06* (2013.01); *B32B 15/08* (2013.01); *B32B 15/20* (2013.01); *B32B 25/02* (2013.01); *B32B 25/08* (2013.01); *B32B 25/10* (2013.01); *B32B 27/06* (2013.01); *B32B 27/065* (2013.01); *B32B 27/08* (2013.01); *B32B 27/12* (2013.01); *B32B 27/14* (2013.01); *B32B 27/16* (2013.01); *B32B 27/28* (2013.01); *B32B 27/281* (2013.01); *B32B 27/283* (2013.01); *B32B 27/285* (2013.01); *C08G 77/04* (2013.01); *C08G 77/38* (2013.01); *C08J 3/24* (2013.01); *C08J 3/28* (2013.01); *H02N 1/04* (2013.01); *H02N 2/186* (2013.01); *B32B 2264/108* (2013.01); *B32B 2307/20* (2013.01); *B32B 2307/202* (2013.01); *B32B 2405/00* (2013.01); *B32B 2457/00* (2013.01); *C08G 77/80* (2013.01); *C08J 2383/04* (2013.01)

(56) References Cited

U.S. PATENT DOCUMENTS

| | | | |
|---|---|---|---|
| 2001/0041935 A1* | 11/2001 | Valyunin | A61F 2/1602 623/6.56 |
| 2004/0068076 A1 | 4/2004 | Kozakai et al. | |
| 2010/0065880 A1* | 3/2010 | Kashiwagi | C03C 25/1095 257/99 |
| 2010/0255319 A1* | 10/2010 | Paul | B32B 27/20 428/446 |
| 2013/0307371 A1 | 11/2013 | Sakashita | |
| 2015/0078794 A1 | 3/2015 | Natori et al. | |
| 2015/0248083 A1 | 9/2015 | Kondoh et al. | |
| 2017/0324023 A1 | 11/2017 | Kondoh et al. | |

FOREIGN PATENT DOCUMENTS

| | | |
|---|---|---|
| JP | 2009-232677 | 10/2009 |
| JP | 2009-232678 | 10/2009 |
| JP | 2009-232679 A | 10/2009 |
| JP | 2010-235589 A | 10/2010 |
| JP | 2012-164727 | 8/2012 |
| JP | 2012-164917 | 8/2012 |
| JP | 2012-178228 | 9/2012 |
| JP | 2012-230806 | 11/2012 |
| JP | 2012-248641 | 12/2012 |
| JP | 2013-249366 | 12/2013 |
| JP | 5563746 | 6/2014 |
| JP | 2014-207391 | 10/2014 |
| JP | 2014-207867 | 10/2014 |
| JP | 2016-103967 | 6/2016 |
| JP | 2016-139779 A | 8/2016 |
| WO | WO 2009/139257 A1 | 11/2009 |
| WO | WO 2010/137366 A1 | 12/2010 |
| WO | WO 2014/105963 A2 | 7/2014 |
| WO | WO 2014/105970 A1 | 7/2014 |
| WO | WO 2016/075882 A1 | 5/2016 |
| WO | WO 2016/117285 A1 | 7/2016 |

OTHER PUBLICATIONS

International Search Report and Written Opinion datd May 10, 2016 for counterpart International Patent Application No. PCT/JP2016/000572 filed Feb. 3, 2016.
Extended European Search Report dated Nov. 16, 2017 in Patent Application No. 16761230.8.
Office Action dated Mar. 25, 2019 in corresponding Japanese Patent Application No. 2015-206044, 3 pages.

* cited by examiner

ELEMENT AND ELECTRIC GENERATOR

TECHNICAL FIELD

The present disclosure relates to elements and electric generators.

BACKGROUND ART

There have been conventionally attempts for effectively utilizing the energy generated by vibrations of a structure, such as roads, bridges, and architecture, vibrations of a moving body, such as cars, and train carriages, and vibration due to human activities. As for a method for effectively utilizing the energy generated by vibrations, there is a method where vibration energy is converted into electric energy. Examples of such a method include a system utilizing a piezoelectric element, and a system utilizing electrostatic induction.

The system utilizing the piezoelectric element uses mainly a ceramic-based piezoelectric element, and utilizes a phenomenon that electric charge is induced at a surface of the piezoelectric element when distortion is applied to the piezoelectric element due to vibrations.

The system utilizing the electrostatic induction typically uses an electret dielectric retaining electric charge semipermanently (for example, see PTL 1 to PTL 3). The electret dielectric used in the aforementioned literatures is a material capable of charging the dielectric to generate an electrostatic field semipermanently. Electric charge is induced to an electrode through electrostatic induction by changing a relative position between the electret dielectric and the electrode disposed being distant from the electret dielectric due to vibrations. As a result, electricity is generated.

Since the system utilizing the piezoelectric element uses mainly a ceramic-based piezoelectric element, there are problems that the element does not have flexibility and the element is easily broken.

In the system utilizing electrostatic induction, a charging treatment needs to be performed on a dielectrics, when an electret derivative for use is produced. Examples of the charging treatment include corona discharge, and a plasma discharge treatment. However, these treatments have a problem that a large quantity of electricity is required. Moreover, a flexibility of an element is not sufficient. In addition, a mechanical capacity varying system is typically disposed, and thus it is difficult to realize a flexible element.

CITATION LIST

Patent Literature

PTL 1: Japanese Patent No. 5563746
PTL 2: Japanese Unexamined Patent Application Publication No. 2012-164727
PTL 3: Japanese Unexamined Patent Application Publication 2012-164917

SUMMARY OF INVENTION

Technical Problem

The present invention aims to provide an element, which has excellent flexibility and excellent durability, and does not require a charging treatment.

Solution to Problem

As the means for solving the aforementioned problems, the element of the present invention includes a first electrode, an intermediate layer, and a second electrode disposed in this order. The intermediate layer includes an organic polymer material, where a molecular structure of the organic polymer material includes a structure represented by formula (1) below.

[Chem.1]

Formula (1)

In the formula (1) above, $R_1$ is a carbonyl group, an ether group, a thioether group, or organopolysiloxane, and $R_1$ may form a cyclic structure (an imide group) with $R_2$; and $R_2$ to $R_6$ are organic groups that may be identical or different, each of the organic groups may have a valency of 2 or more and may form another structure.

Advantageous Effects of Invention

The present invention can provide an element, which has excellent flexibility and excellent durability, and does not require a charging treatment.

BRIEF DESCRIPTION OF DRAWINGS

FIG. 1-1 is a schematic cross-sectional view illustrating an embodiment of the element of the present invention.

FIG. 1-2 is a schematic cross-sectional view illustrating an embodiment of the element of the present invention, in which a space is disposed between one electrode and an intermediate layer.

FIG. 1-3 is a schematic cross-sectional view illustrating an embodiment of the element of the present invention, in which a space is disposed between one electrode and an intermediate layer, and a space is disposed between the other electrode and the intermediate layer.

FIG. 2-1 is a schematic cross-sectional view illustrating an example where an electric wire is disposed between each of the electrodes in the element illustrated in FIG. 1-2 and a respective cover material.

FIG. 2-2 is a schematic cross-sectional view illustrating an example where a space is disposed between the first electrode and intermediate layer of the element illustrated in FIG. 2-1, using a spacer.

DESCRIPTION OF EMBODIMENTS (Element)
The element of the present invention includes a first electrode, an intermediate layer, and a second electrode, disposed in this order. The element of the present invention may further include other members, if necessary.

<First Electrode and Second Electrode>

A material, shape, size, and structure of each of the first electrode and the second electrode are appropriately selected depending on the intended purpose without any limitation.

The material, shape, size, and structure of the first electrode may be identical to or different from the material, shape, size, and structure of the second electrode, but the material, shape, size, and structure of the first electrode are preferably identical to the material, shape, size, and structure of the second electrode.

Examples of the material of the first electrode and the second electrode include metal, a carbon-based conductive material, and a conductive rubber composition.

Examples of the metal include gold, silver, copper, aluminium, stainless steel, tantalum, nickel, and phosphor bronze.

Examples of the carbon-based conductive material include graphite, carbon fiber, and carbon nanotubes.

Examples of the conductive rubber composition include a composition containing conductive filler and rubber.

Examples of the conductive filler include a carbon material (e.g., Ketjenblack, acetylene black, graphite, carbon fiber, carbon nanofiber, and carbon nanotube), metal filler (e.g., gold, silver, platinum, copper, iron, nickel, and aluminium), a conductive polymer material (e.g., a derivative of any of polythiophene, polyacetylene, polyaniline, polypyrrole, poly(p-phenylene), and poly(p-phenylene)vinylene derivative, or the derivatives doped with a dopant, such as anions, and cations), and an ionic liquid. These may be used alone, or in combination.

Examples of the rubber include silicone rubber, modified silicone rubber, fluorosilicone rubber, acrylic rubber, chloroprene rubber, polysulfide rubber, urethane rubber, isobutyl rubber, butadiene rubber, styrene butadiene rubber, butyl rubber, ethylene rubber, and natural rubber (latex).

Examples of the form of the first electrode and the form of the second electrode include a sheet, a film, a film, a woven fabric, a non-woven fabric, a mesh, a sponge, and a deposition film. The form of the first electrode and the form of the second electrode can be appropriately selected depending on a shape of an element without any limitation.

The size of the first electrode and the size of the second electrode are not particularly limited, and are appropriately selected depending on a shape of an element.

The average thickness of the first electrode and the average thickness of the second electrode can be appropriately selected depending on a structure of an element. In view of conductivity and flexibility of a resulting element, the average thickness of the first electrode and the average thickness of the second electrode are preferably in a range from 0.01 µm through 1 mm, more preferably in a range from 0.1 µm through 500 µm. When the average thickness of the first electrode and the average thickness of the second electrode are 0.01 µm or greater, an appropriate mechanical strength can be attained, and thus conductivity of a resulting element improves. When the average thickness of the first electrode and the average thickness of the second electrode are 1 mm or less, a resulting element is deformable, and thus excellent electricity generation performance can be attained.

<Intermediate Layer>

The intermediate layer includes an organic polymer material, where a molecular structure of the organic polymer material includes a structure represented by formula (1) below. In the present invention, the aforementioned structure may be included in a principle chain or side chain of the organic polymer material. Moreover, the structure may be included as a cross-linking agent to bond molecules of the organic polymer material to each other.

[Chem.2]

Formula (1)

In the formula (1) above, $R_1$ is a carbonyl group, an ether group, a thioether group, or organopolysiloxane, and $R_1$ may form a cyclic structure (an imide group) with $R_2$; and $R_2$ to $R_6$ are organic groups that may be identical or different, where each of the organic groups may have a valency of 2 or more and may form another structure.

Examples of the organic polymer material, in which the structure represented by the formula (1) is included in a principle chain of the material, include a thermoplastic resin (e.g., polyethylene terephthalate, polyethylene naphthalate, and polyurethane), a thermoset resin (e.g., an epoxy resin, a phenol resin, and a melamine resin), engineering plastics (e.g., aromatic polyamide, aromatic polyimide, and polycarbonate), and super engineering plastics (e.g., polyphenylene sulfide, polyether imide, polyether ether ketone, and polyether sulfone).

Examples of the organic polymer material, in which the structure represented by the formula (1) is included in a side chain of the material, include a thermoplastic resin (e.g., polystyrene, and an acrylonitrile butadiene styrene resin), and a thermoset elastomer (e.g., styrene butadiene rubber, and phenyl silicone rubber).

Moreover, examples of a cross-linking agent including the structure represented by the formula (1) include acid anhydride (e.g., phthalic anhydride, and maleic anhydride), and isocyanuric acid derivatives [e.g., divinyl benzene, triallyl isocyanurate, triglycidyl isocyanurate, tris-(3-trimethoxysilylpropyl)isocyanurate, tris(2-hydroxyethyl)isocyanurate, tris(2-carboxyethyl)isocyanurate, allyl diglycidyl isocyanurate, diallyl glycidyl isocyanurate, and methyl diallyl isocyanurate]. Since the intermediate layer includes the aforementioned material, a resulting element can achieve a large electricity generation amount.

When an electron-withdrawing substituent is contained in the structure represented by the formula (1), moreover, a larger electricity generation amount of an element can be achieved. Examples of the electron-withdrawing substituent include a nitro group, a cyano group, halogen, a phenyl group, a carboxyl group, an acyl group, aldehyde, sulfonic acid, a sulfoxide group, a vinyl group, an allyl group, an alkynyl group, and isocyanurate.

The intermediate layer may contain various fillers to impart various functions.

Examples of the fillers include metal oxide (e.g., titanium oxide, zinc oxide, iron oxide, and silica), metal complex oxide (e.g., barium titanate, and lead zirconate titanate), metal carbonate (e.g., calcium carbonate), a carbon material (e.g., carbon black, graphite, carbon fiber, carbon nanotube, fullerene [including derivatives], and graphene), an organic compound (e.g., a styrene resin, an acrylic resin, a melamine resin, an acrylonitrile resin, a silicone resin, and PTFE), minerals (e.g., mica, clay, and synthetic hydrotalcite), and elemental metal (e.g., gold, silver, copper, and aluminium).

The intermediate layer may be a single layer, or multiple layers.

The average thickness of the intermediate layer is appropriately selected depending on the intended purpose without any limitation. The average thickness of the intermediate layer is preferably in a range from 1 µm through 10 mm, more preferably in a range from 20 µm through 200 µm. When the average thickness of the intermediate layer is within the aforementioned range, a uniform film can be formed as the intermediate layer, and the intermediate layer does not inhibit deformation of a resulting element. When the average thickness is 1 µm or greater, an appropriate mechanical strength can be attained, and thus an electricity generation performance of a resulting element improves. When the average thickness is 10 mm or less, the intermediate layer has excellent flexibility, and thus an electricity generation performance of a resulting element improves.

As for electrical properties of the intermediate layer, the intermediate layer is preferably insulation. As for the insulation properties, the intermediate layer preferably has volume resistivity of $10^8$ Ωcm or greater, more preferably $10^{10}$ Ωcm or greater. By adjusting the volume resistivity of the intermediate layer to the aforementioned preferred numerical range, an excellent electricity generation performance can be achieved.

<<Surface Modification Treatment>>

The intermediate layer may be subjected to a surface modification treatment. Examples of the surface modification treatment include a plasma treatment, a corona discharge treatment, a UV-ray irradiation treatment, an ozone treatment, and a radial-ray (X-ray, alpha-ray, beta-ray, gamma-ray, electron beam, neutron, or heavy ion) irradiation treatment. Among them, preferred in view of a processing efficiency are a plasma treatment, a corona discharge treatment, and an electron-beam irradiation treatment. However, the surface modification treatment is not limited to the aforementioned treatments, provided that the surface modification treatment to be performed is a treatment, which applies a certain level of radiation energy to modify a material to be treated.

—Plasma Treatment—

In case of the plasma treatment, a plasma generating device is, for example, an atmospheric pressure plasma device, as well as a parallel-plate plasma device, a capacity-coupled plasma device, or an inductively-coupled plasma device. In view of durability of a treated intermediate layer, the plasma treatment is preferably a low-pressure plasma treatment.

The reaction pressure of the plasma treatment is appropriately selected depending on the intended purpose without any limitation. The reaction pressure is preferably in a range from 0.05 Pa through 100 Pa, more preferably in a range from 1 Pa through 20 Pa. When the reaction pressure is within the aforementioned range, an amount of the electricity generating with the intermediate layer can be increased, and durability can be maintained, as an excessive amount of the energy is not applied.

The reaction atmosphere of the plasma treatment is appropriately selected depending on the intended purpose without any limitation. For example, gas, such as inert gas, noble gas, and oxygen, is effective as the reaction atmosphere. The reaction atmosphere is preferably argon in view of continuity of an effect. Moreover, it is preferred that the oxygen partial pressure of the reaction atmosphere be adjusted to 5,000 ppm or less. When the oxygen partial pressure of the reaction atmosphere is 5,000 ppm or less, generation of ozone can be suppressed, and use of an ozone processing device can be avoided.

The electricity radiation dose in the plasma treatment is defined by (output×irradiation duration). The electricity radiation does is preferably in a range from 5 Wh through 200 Wh, more preferably in a range from 10 Wh through 50 Wh. When the electricity radiation does is within the aforementioned preferred range, an amount of the electricity generating with the intermediate layer can be increased, and durability can be maintained, as an excessive amount of the energy is not applied.

—Corona Discharge Treatment—

The applied energy (cumulative energy) in the corona discharge treatment is preferably in a range from 6 $J/cm^2$ through 300 $J/cm^2$, more preferably in a range from 12 $J/cm^2$ through 60 $J/cm^2$. When the applied energy is within the aforementioned preferred range, an amount of the electricity generating with the intermediate layer can be increased, and durability can be maintained, as an excessive amount of the energy is not applied. Moreover, the applied voltage in the corona discharge treatment is preferably in a range from 50 V through 150 V, more preferably 100 V. The reaction atmosphere of the corona discharge treatment is preferably air.

—Electron-Beam Irradiation Treatment—

The radiation dose of the electron-beam irradiation treatment is preferably 1 kGy or greater, more preferably in a range from 300 kGy through 10 MGy. When the radiation dose is within the aforementioned preferred range, an amount of the electricity generating with the intermediate layer can be increased, and durability can be maintained, as an excessive amount of the energy is not applied.

The reaction atmosphere of the electron-beam irradiation treatment is appropriately selected depending on the intended purpose without any limitation. The reaction atmosphere is preferably an atmosphere the oxygen partial pressure of which is adjusted to 5,000 ppm or less by filling with inert gas, such as argon, neon, helium, and nitrogen. When the oxygen partial pressure of the reaction atmosphere is 5,000 ppm or less, generation of ozone can be suppressed, and use of an ozone processing device can be avoided.

—UV-Ray Irradiation Treatment—UV rays used in the UV-ray irradiation treatment preferably have wavelengths of 200 nm or longer but 365 nm or shorter, more preferably 240 nm or longer but 320 nm or shorter.

The cumulative radiation of the UV-ray irradiation treatment is preferably in a range from 5 $J/cm^2$ through 500 $J/cm^2$, more preferably in a range from 50 $J/cm^2$ through 400 $J/cm^2$. When the cumulative radiation is within the aforementioned preferred range, an amount of the electricity generating with the intermediate layer can be increased, and durability can be maintained, as an excessive amount of the energy is not applied. The reaction atmosphere of the UV-ray irradiation treatment is appropriately selected depending on the intended purpose without any limitation. The reaction atmosphere is preferably an atmosphere the oxygen partial pressure of which is adjusted to 5,000 ppm or less by filling with inert gas, such as argon, neon, helium, and nitrogen. When the oxygen partial pressure of the reaction atmosphere is 5,000 ppm or less, generation of ozone can be suppressed, and use of an ozone processing device can be avoided.

In the related art, proposed is that an interlayer adhesion is enhanced by exciting or oxidizing a material through a plasma treatment, a corona discharge treatment, a UV-ray irradiation treatment, or an electron-beam irradiation treat- ment, to thereby form active groups. However, these techniques are only limited to the application between layers, and are not suitable for an outermost surface, as lubricity are lowered. Moreover, a reaction of any of the aforementioned treatments is performed in an oxygen-rich state, to effectively introduce reaction active groups (hydroxyl groups). Accordingly, the aforementioned related art is fundamentally different from the surface modification treatment performed in the present invention.

The surface modification treatment is a treatment (e.g., a plasma treatment) that is performed in a reaction environment of a low oxygen content with reduced pressure. Therefore, the surface modification treatment accelerates re-cross-linking and bonding of the surface to improve durability, for example, owing to "an increase of Si—O bonds having high bonding energy."

<Structure of Element>

The element of the present invention includes a first electrode, an intermediate layer, and a second electrode, the first electrode, the intermediate layer, and the second electrode being disposed in this order, the intermediate layer including an organic polymer material, where a molecular structure of the organic polymer material includes a structure represented by formula (1) below.

[Chem. 3]

Formula (1)

In the formula (1), $R_1$ is a carbonyl group, an ether group, a thioether group, or organopolysiloxane, and $R_1$ may form a cyclic structure (an imide group) with $R_2$; and $R_2$ to $R_6$ are organic groups that may be identical or different, where each of the organic groups may have a valency of 2 or more and may form another structure.

The element of the present invention is deformed by an external force, such as vibrations, to thereby generate electricity. The mechanism of electric generation of the element of the present invention has not been clarified, but it is assumed as follows. As a load is applied, the intermediate layer adjacent to the electrode is charged with a mechanism similar to friction charging, or charge is generated inside the intermediate layer. As a result of the aforementioned charging, a difference in surface potential is caused within the element. The charge is moved to make the surface potential difference zero, and thus electricity runs (is generated), if electric wires are connected.

The element of the present invention deforms to generate electricity, as a load, such as an external force or vibrations is applied to the element. The mechanism of electric generation of the element of the present invention has not been clarified, but it is assumed as follows. As a load is applied, the intermediate layer adjacent to the electrode is charged with a mechanism similar to friction charging, or charge is generated inside the intermediate layer. As a result of the aforementioned charging, a difference in surface potential is caused within the element. The charge is moved to make the surface potential difference zero, to thereby generate electricity.

The element preferably includes a space disposed between the intermediate layer and the first electrode, or between the intermediate layer and the second electrode, or both. As the space is disposed, an electricity generation amount of a resulting element can be increased. The method for disposed a space is appropriately selected depending on the intended purpose without any limitation. Examples of the method include a method including disposing a space between the intermediate layer and the first electrode, or between the intermediate layer and the second electrode, or both.

Figure 11:
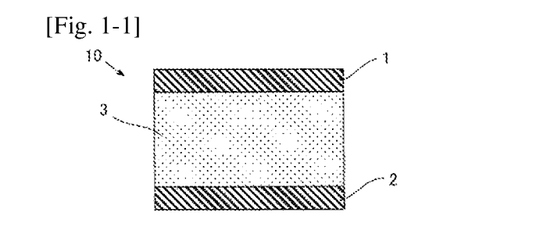
Figure 12:
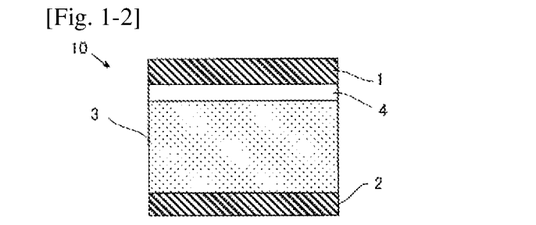
Figure 13:
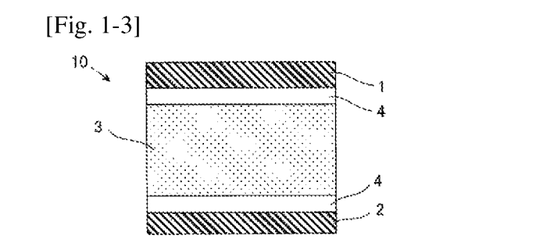

A schematic view illustrating one example of the element of the present invention is depicted. FIG. 1 (FIGS. 1-1, 1-2, and 1-3) is a schematic cross-sectional view illustrating some examples of the embodiment of the element of the present invention. The element of each example has the same basic structure where a first electrode 1, an intermediate layer 3, and a second electrode 2 are disposed in this order.

FIG. 1-1 illustrates an element, in which a first electrode 1, an intermediate layer 3, and a second electrode 2 are disposed in this order.

FIG. 1-2 illustrates an element, in which a space 4 is disposed between an electrode 1 and an intermediate layer 3. Note that, a space 4 may be disposed between an electrode 2 and the intermediate layer 3, instead of disposing the space 4 between the electrode 1 and the intermediate layer 3.

FIG. 1-3 illustrates an element, in which a space is disposed between an electrode 1 and an intermediate layer 3, as well as between an electrode 2 and the intermediate layer 3.

Figure 21:
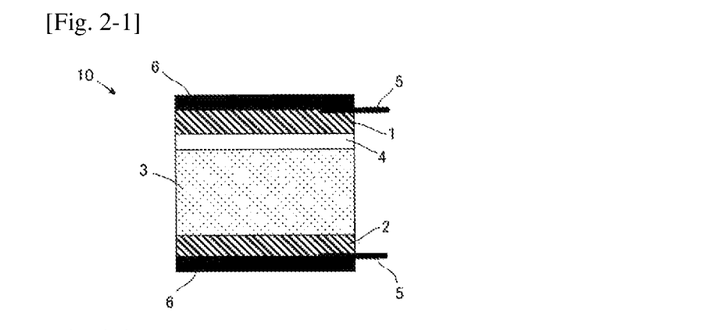
Figure 22:
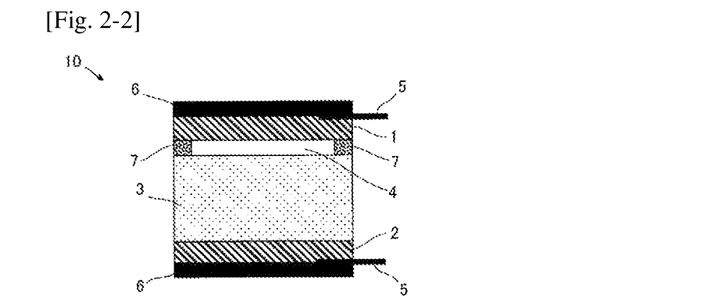

Moreover, FIG. 2 (FIGS. 2-1 and 2-2) is a schematic cross-sectional view illustrating one example of an element for evaluating an electricity generation amount of the element of the present invention. FIG. 2-1 illustrates an element, in which a first electrode 1, an intermediate layer 3, and a second electrode 2 are disposed in this order, a space is disposed between the first electrode 1 and the intermediate layer 3, and an electrical wire 5 for extracting electricity is disposed between the first electrode 1 and a cover material 6. FIG. 2-2 illustrates the element of FIG. 2-1, in which a spacer 7 for retaining the space 4 is further disposed.

(Electric Generator)

The electric generator of the present invention includes at least the element of the present invention, and may further include other members, if necessary.

<Other Members>

Examples of the aforementioned other members include a cover material, an electrical wire, and an electric circuit.

—Cover Material—

The cover material 12 is appropriately selected depending on the intended purpose without any limitation.

Examples of a material of the cover material include a polymer material, and rubber. Examples of the polymer material include polyethylene, polypropylene, polyethylene terephthalate, polyvinyl chloride, a polyimide resin, a fluororesin, and an acrylic resin. Examples of the rubber include silicone rubber, modified silicone rubber, acrylic rubber, chloroprene rubber, polysulfide rubber, urethane rubber, isobutyl rubber, fluorosilicone rubber, ethylene rubber, and natural rubber (latex).

A foam, shape, size, and thickness of the cover material are appropriately selected depending on an electric generator, without any limitation.

(Electrical Wire)

The electrical wire 13 is appropriately selected depending on the intended purpose without any limitation.

Examples of a material of the electrical wire include metal and alloy. Examples of the metal include gold, silver, copper, aluminium, and nickel.

A foam, shape, and thickness of the electrical wire are appropriately selected depending on an electric generator without any limitation.

<<Electric Circuit>>

The electric circuit is appropriately selected depending on the intended purpose without any limitation, provided that the electric circuit is a circuit from which electricity generated in the element is taken out.

<Structure of Electric Device>

Examples of an electric generator equipped with the element of the present invention are explained with reference to FIGS. 3 and 4.

Figure 3:
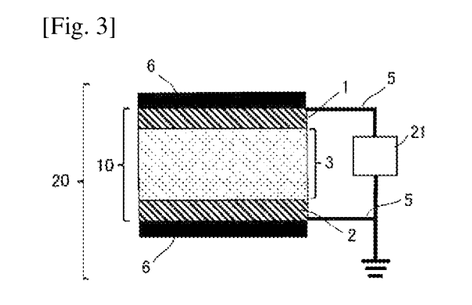
FIG. 3 is a schematic cross-sectional view illustrating an embodiment of the electric generator of the present invention.

The electric generator 20 illustrated in FIG. 3 includes an element 10, cover materials 6, electrical wires 5, and an electric circuit 21.

Figure 4:
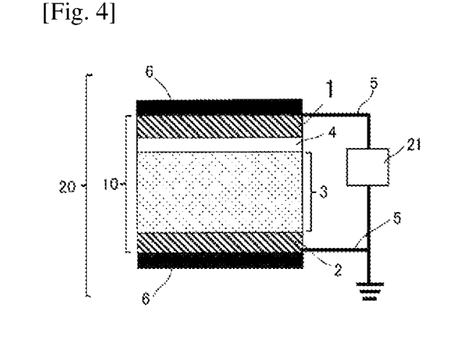
FIG. 4 is a schematic cross-sectional view illustrating another embodiment of the electric generator of the present invention.

Moreover, FIG. 4 is a cross-sectional view illustrating another example of the structure of the electric generator 20 of the present invention. In the element 10 of the electric generator 20 illustrated in FIG. 4, a space 6 is disposed. Since the element 10 has the space 6, the element 10 has a structure that is easily deformed. Accordingly, a capacitance of the element 10 changes even with weak vibrations, to thereby increase an electricity generation amount.

<Use>

For example, the electric generator is suitably used for various sensors, such as an ultrasonic sensor, a pressure sensor, a tactile sensor, a distortion sensor, an acceleration sensor, a shock sensor, a vibration sensor, a pressure-sensitive sensor, an electric field sensor, and a sound pressure sensor. Particularly, the electric generator is suitably used for a wearable sensor, as high voltage is not required. Moreover, the electric generator is suitably used as a piezoelectric film having excellent processability in a head phone, a speaker, a microphone, a hydrophone, a display, a fan, a pump, a variable focal lens, an ultrasonic transducer, a piezoelectric transformer, a sound insulator, a soundproofing material, an actuator, or a keyboard. Moreover, the electric generator can be used for an audio system, an information processing device, a measuring device, a medical device, a vehicle, a building, a damping material used for sports equipment, such as ski, and a racket, and other fields.

Furthermore, the electric generator is suitably used for the following applications.

Generation of electricity using natural energy, such as wave power, water power, and wind power.

Generation of electricity by walking by humans, when the electric generator is embedded in shoes, clothes, a floor, or accessories.

Generation of electricity using vibrations caused by traveling, when the electric generator is embedded in tires of automobiles.

Moreover, the electric generator is expected to be applied as a plate electric generator prepared by forming the electric generator on a flexible substrate, a secondary battery that is charged by applying voltage, or a novel actuator (e.g., artificial muscles).

EXAMPLES

Examples of the present invention are explained hereinafter, but the following examples shall not be construed as to limit the scope of the present invention in any way. In the following descriptions, "part(s)" denotes "part(s) by mass" and "%" denotes "% by mass," unless otherwise stated.

Example 1

<Production of Element>

<<Intermediate Layer>>

A polyethylene terephthalate (referred to as PET hereinafter) film (LUMIRROR (registered trademark) T60, manufactured by TORAY INDUSTRIES, INC., thickness: 100 µm) was cut out into a piece in the size of 50 mm×70 mm. Thereafter, the cut piece was subjected to a plasma discharge treatment, as a surface modification treatment, under the following conditions, to thereby obtain an intermediate layer.

—Plasma Discharge Treatment Conditions—

Device: PR-500 (manufactured by Yamato Scientific Co., Ltd.)

Output: 100 W

Processing time: 4 minutes

Reaction atmosphere: argon (99.999%)

Reaction pressure: 10 Pa

<<Electrodes>>

As for electrodes used in this example, conductive nonwoven fabrics formed of PET fibers plated with copper and nickel (SUI-80-M30, manufactured by SEIREN Co., Ltd., average thickness: 35 µm) were used. The intermediate layer, which had been subjected to the surface modification treatment, was sandwiched with the two electrodes, and a lead wire (C3/RV-90/0.75SQ, manufactured by Taiyo Cabletec Corporation) was attached to each electrode. Then, a conductive cloth tape (E05R1020, manufactured by SEIWA ELECTRIC MFG CO., LTD., thickness: 120 µm) cut into a width of 5 mm was disposed as a spacer when the entire body was sealed with a laminate film (SLF-K02G, manufactured by Europort Co., Ltd., thickness: 80 µm) formed of polyvinyl chloride, to thereby obtain an element, in which a space was formed between the electrode and the intermediate layer.

Examples 2 to 7

Elements were each obtained in the same manner as in Example 1, provided that the PET film was replaced with the following resin film.

Example 2: polyimide (UPILEX (registered trademark) 125S, manufactured by UBE INDUSTRIES, LTD., thickness: 130 µm)

Example 3: polyether imide (ULTEM (registered trademark) 1000, manufactured by SABIC, thickness: 70 µm)

Example 4: polyether sulfone (VERADEL (registered trademark) A-300A, manufactured by Solvay Japan, Ltd., thickness: 100 µm)

Example 5: polyphenylene sulfide (TORELINA (registered trademark) E1380, manufactured by TORAY INDUSTRIES, INC., thickness: 95 µm)

Example 6: polyether ether ketone (APTIV (registered trademark) 2000, manufactured by Victrex PLC, thickness: 100 µm)

Example 7: polyethylene naphthalate (TEONEX (registered trademark) Q51, manufactured by Teijin DuPont Films Japan Limited, thickness: 75 µm)

Example 8

<Production of Element>
<<Intermediate Layer>>

Into 100 parts of dimethyl silicone rubber (TSE3033, manufactured by Momentive Performance Materials Inc.) serving as a base material, 6 parts of a 50% divinyl benzene (D0958, manufactured by Tokyo Chemical Industry Co., Ltd.) toluene solution was mixed. The resulting mixture was applied onto a PET film by blade coating, followed by baking in a hot air oven for 30 minutes at 120 degrees Celsius, to thereby obtain a thin film having a thickness of 90 μm.

Subsequently, electron beams were applied onto the obtained thin film under the following conditions, to thereby obtain an intermediate layer.

—Electron-Beam Irradiation Treatment Conditions—

Device: line-irradiation low-energy electron beam light source (manufactured by Hamamatsu Photonics K.K)
Radiation dose: 1 MGy
Reaction atmosphere: nitrogen (including oxygen having partial pressure of 5,000 ppm or less)

<<Electrode>>

As for electrodes, aluminium/PET composite films (AL-PET (registered trademark) 9-100, manufactured by PANAC CO., LTD., aluminium: 9 μm/PET: 100 μm) were used.

The intermediate layer, which had been subjected to the surface modification treatment, was sandwiched with the two electrodes in the manner that the aluminium surface of each electrode faced the intermediate layer, and a lead wire (C3/RV-90/0.75SQ, manufactured by Taiyo Cabletec Corporation) was attached to each electrode. Then, a PET film spacer (LUMIRROR (registered trademark) H10, manufactured by TORAY INDUSTRIES, INC., thickness: 480 μm) was disposed when the entire body was sealed with a laminate film (SLF-K02G, manufactured by Europort Co., Ltd., thickness: 80 μm) formed of polyvinyl chloride, to thereby obtain an element, in which a space was formed between the electrode and the intermediate layer.

Examples 9 and 10

Elements were each obtained in the same manner as in Example 8, provided that the base material was replaced with the following silicone rubber.

Example 9: dimethyl silicone rubber (DY35-2083, manufactured by DOW CORNING TORAY CO., LTD.)
Example 10: dimethyl silicone rubber (KE-1300, manufactured by Shin-Etsu Chemical Co., Ltd.)

Example 11

An element was obtained in the same manner as in Example 8, provided that 6 parts of the 50% divinyl benzene toluene solution was replaced with 10 parts of a 50% methyl diallyl isocyanurate (MEDAIC, manufactured by Shikoku Chemicals Corporation) toluene solution.

Examples 12 and 13

Elements were each obtained in the same manner as in Example 11, provided that the base material was replaced with the following silicone rubber.

Example 12: dimethyl silicone rubber (DY35-2083, manufactured by DOW CORNING TORAY CO., LTD.)
Example 13: dimethyl silicone rubber (KE-1300, manufactured by Shin-Etsu Chemical Co., Ltd.)

Example 14

Onto a PET film, 100 parts of phenyl silicone rubber (XE14-C3450, manufactured by Momentive Performance Materials Inc.) was applied by blade coating, followed by baking in a hot air oven for 30 minutes at 120 degrees Celsius, to thereby obtain a thin film having a thickness of 80 μm. Subsequently, electron beams were applied to the obtained thin film under the same conditions to those of Example 8, to thereby obtain an intermediate layer. The intermediate layer, which had been subjected to the surface modification treatment, was sandwiched with the two electrodes, AL-PET (registered trademark), in the manner that the aluminium surface of each electrode faced the intermediate layer, and a lead wire (C3/RV-90/0.75SQ, manufactured by Taiyo Cabletec Corporation) was attached to each electrode. Then, the entire body was sealed with a laminate film (SLF-K02G, manufactured by Europort Co., Ltd., thickness: 80 μm) formed of polyvinyl chloride, to thereby obtain an element, in which there was no space formed between the electrode and the intermediate layer.

Example 15

An element, in which a space was disposed between the intermediate layer and the electrode, was obtained in the same manner as in Example 14, provided that a conductive cloth tape (E05R1020, manufactured by SEIWA ELECTRIC MFG CO., LTD., thickness: 120 μm) cut into a width of 5 mm was disposed as a spacer when the entire body was sealed with the laminate film.

Example 16

An element, in which a space was disposed between the intermediate layer and the electrode, was obtained in the same manner as in Example 14, provided that a PET film (LUMIRROR (registered trademark) H10, manufactured by TORAY INDUSTRIES, INC., thickness: 480 μm) was disposed as a spacer when the entire body was sealed with the laminate film.

Example 17

A thin film having a thickness of 75 μm was obtained in the same manner as in Example 15, provided that the phenyl silicone rubber was replaced with dimethyl silicone rubber (TSE3033, manufactured by Momentive Performance Materials Inc.), and 10 parts of a 1% soluble fullerene derivative ([60] PCBM, product code: M2088, manufactured by Tokyo Chemical Industry Co., Ltd.) toluene solution was added to 100 parts of the dimethyl silicone rubber. An element, in which a space was disposed between the intermediate layer and the electrode, was obtained in the same manner as Example 15, after the formation of the thin film.

Example 18

A thin film having a thickness of 75 μm was obtained in the same manner as in Example 15, provided that the phenyl silicone rubber was replaced with dimethyl silicone rubber (TSE3033, manufactured by Momentive Performance Materials Inc.), and 10 parts of a 1% hydrogenated fullerene (nanom spectra A100, manufactured by Frontier Carbon Corporation) xylene solution was added to 100 parts of the dimethyl silicone rubber. An element, in which a space was disposed between the intermediate layer and the electrode, was obtained in the same manner as Example 15, after the formation of the thin film.

Example 19

<Production of Element>
The element produced in Example 8 was used.
<Evaluation>
The element of Example 8 was connected to a function generator (FG-274, manufactured by TEXIO TECHNOLOGY CORPORATION) in the manner that electrodes facing to each other had mutually different polarities. Voltage was applied to the element under the following conditions, and audibility of sound from the location apart from the element by 1 m was judged. A case where the sound of the element was audible with all frequencies was judged as an acceptable level. The result is presented in Table 2.
<Application Conditions>
CMOS output: ±5 V
Output waveform: square wave (Duty ratio: 50%)
Frequency: 400 Hz, 2 kHz, and 12 kHz Comparative Example 1

An element was obtained in the same manner as in Example 1, provided that the PET film serving as the intermediate layer was replaced with a low-density polyethylene film (NOVATEC (registered trademark) LD LF280H, manufactured by Japan Polyethylene Corporation, thickness: 80 μm).

Comparative Example 2

An element was obtained in the same manner as in Comparative Example 1, provided that the intermediate layer was replaced with a polypropylene film.

Comparative Examples 3 to 5

Elements of Comparative Examples 3 to 5 were each obtained in the same manner as in Example 14, provided that the phenyl silicone rubber was replaced with the following rubber.

Comparative Example 3: dimethyl silicone rubber (TSE3033, manufactured by Momentive Performance Materials Inc.)
Comparative Example 4: dimethyl silicone rubber (DY35-2083, manufactured by DOW CORNING TORAY CO., LTD.)
Comparative Example 5: dimethyl silicone rubber (KE-1300, manufactured by Shin-Etsu Chemical Co., Ltd.)

Comparative Example 6

<Production of Element>
An element was produced in the same manner as in Example 19, provided that a surface modification treatment was not performed.
<Evaluation>
The obtained element was evaluated in the same manner as in Example 19. The result is presented in Table 2.
<Evaluation>
<<Measurement of Electricity Generation Amount>>
Oscilloscope (WaveAce1001, manufactured by Teledyne LeCroy Japan Corporation) was attached to the electric wire taken out from the obtained element. An iron ball (weight: 200 g) was dropped from 10 cm high on the element, and peak voltage generated between the electrode was measured. The measurement was performed 5 times to determine the average value. The power generating performance was evaluated with ranks, using the average value of Comparative Example 1 as a standard. The results are presented in Table 1.
—Evaluation Criteria—
A: The value was 10 times or greater compared to the measurement value of Comparative Example 1.
B: The value was 5 times or greater but less than 10 times compared to the measurement value of Comparative Example 1.
C: The value was 3 times or greater but less than 5 times compared to the measurement value of Comparative Example 1.
D: The value was less than 3 times compared to the measurement value of Comparative Example 1.

TABLE 1-1-1

| | | Structure | | | | |
|---|---|---|---|---|---|---|
| | | Intermediate layer | | | Surface modification treatment | |
| | Base material | Additive | Amount (mass parts) | Thickness (μm) | Method | Reaction atmosphere |
| Ex. 1 | LUMIRROR T60 | None | NA | 100 | Plasma discharge | Argon |
| Ex. 2 | UPILEX 125S | None | NA | 130 | Plasma discharge | Argon |
| Ex. 3 | ULTEM 1000 | None | NA | 70 | Plasma discharge | Argon |
| Ex. 4 | VERADEL A-300A | None | NA | 100 | Plasma discharge | Argon |
| Ex. 5 | TORELINA E1380 | None | NA | 95 | Plasma discharge | Argon |
| Ex. 6 | APTIV 2000 | None | NA | 100 | Plasma discharge | Argon |
| Ex. 7 | TEONEX Q51 | None | NA | 75 | Plasma discharge | Argon |
| Ex. 8 | TSE3033 | D 0958 | 3 | 90 | Electron beam irradiation | Nitrogen + oxygen (5,000 ppm or less) |

TABLE 1-1-1-continued

| | Structure | | | | |
|---|---|---|---|---|---|
| | Intermediate layer | | | | Surface modification treatment | |
| | Base material | Additive | Amount (mass parts) | Thickness (μm) | Method | Reaction atmosphere |
| Ex. 9 | DY35-2083 | D 0958 | 3 | 90 | Electron beam irradiation | Nitrogen + oxygen (5,000 ppm or less) |
| Ex. 10 | KE-1300 | D 0958 | 3 | 90 | Electron beam irradiation | Nitrogen + oxygen (5,000 ppm or less) |
| Ex. 11 | TSE3033 | MEDAIC | 5 | 90 | Electron beam irradiation | Nitrogen + oxygen (5,000 ppm or less) |
| Ex. 12 | DY35-2083 | MEDAIC | 5 | 90 | Electron beam irradiation | Nitrogen + oxygen (5,000 ppm or less) |
| Ex. 13 | KE-1300 | MEDAIC | 5 | 90 | Electron beam irradiation | Nitrogen + oxygen (5,000 ppm or less) |

TABLE 1-1-2

| | Structure | | | | Evaluation result | |
|---|---|---|---|---|---|---|
| | Electrode | | Spacer | | Generated voltage | |
| | Material | Thickness (μm) | Material | Thickness (μm) | Peak voltage ratio | Judgement |
| Ex. 1 | SUI-80-M30 | 35 | E05R1020 | 120 | 5 | B |
| Ex. 2 | SUI-80-M30 | 35 | E05R1020 | 120 | 3 | C |
| Ex. 3 | SUI-80-M30 | 35 | E05R1020 | 120 | 4 | C |
| Ex. 4 | SUI-80-M30 | 35 | E05R1020 | 120 | 6 | B |
| Ex. 5 | SUI-80-M30 | 35 | E05R1020 | 120 | 3 | C |
| Ex. 6 | SUI-80-M30 | 35 | E05R1020 | 120 | 3 | C |
| Ex. 7 | SUI-80-M30 | 35 | E05R1020 | 120 | 6 | B |
| Ex. 8 | AL-PET 9-100 | Al 9/ PET 100 | E05R1020 | 120 | 7 | B |
| Ex. 9 | AL-PET 9-100 | Al 9/ PET 100 | E05R1020 | 120 | 9 | B |
| Ex. 10 | AL-PET 9-100 | Al 9/ PET 100 | E05R1020 | 120 | 8 | B |
| Ex. 11 | AL-PET 9-100 | Al 19/ PET 100 | E05R1020 | 120 | 12 | A |
| Ex. 12 | AL-PET 9-100 | Al 9/ PET 100 | E05R1020 | 120 | 15 | A |
| Ex. 13 | AL-PET 9-100 | Al 9/ PET 100 | E05R1020 | 120 | 14 | A |

TABLE 1-2-1

| | Structure | | | | | |
|---|---|---|---|---|---|---|
| | Intermediate layer | | | | Surface modification treatment | |
| | Base material | Additive | Amount (mass parts) | Thickness (μm) | Method | Reaction atmosphere |
| Ex. 14 | XE14-C3450 | None | NA | 80 | Electron beam irradiation | Nitrogen + oxygen (5,000 ppm or less) |
| Ex. 15 | XE14-C3450 | None | NA | 80 | Electron beam irradiation | Nitrogen + oxygen (5,000 ppm or less) |
| Ex. 16 | XE14-C3450 | None | NA | 80 | Electron beam irradiation | Nitrogen + oxygen (5,000 ppm or less) |
| Ex. 17 | TSE3033 | M2088 | 0.1 | 75 | Electron beam irradiation | Nitrogen + oxygen (5,000 ppm or less) |
| Ex. 18 | TSE3033 | NS-A100 | 0.1 | 75 | Electron beam irradiation | Nitrogen + oxygen (5,000 ppm or less) |
| Comp. Ex. 1 | NOVATEC LD LF208H | None | NA | 80 | Plasma discharge | Argon |
| Comp. Ex. 2 | Torayfan 2500H | None | NA | 60 | Plasma discharge | Argon |
| Comp. Ex. 3 | TSE3033 | None | NA | 90 | Electron beam irradiation | Nitrogen + oxygen (5,000 ppm or less) |
| Comp. Ex. 4 | DY35-2083 | None | NA | 90 | Electron beam irradiation | Nitrogen + oxygen (5,000 ppm or less) |
| Comp. Ex. 5 | KE-1300 | None | NA | 90 | Electron beam irradiation | Nitrogen + oxygen (5,000 ppm or less) |

TABLE 1-2-2

| | Structure | | | | Evaluation result | |
|---|---|---|---|---|---|---|
| | Electrode | | Spacer | | Generated voltage | |
| | Material | Thickness (μm) | Material | Thickness (μm) | Peak voltage ratio | Judgement |
| Ex. 14 | AL-PET 9-100 | Al 9/ PET 100 | None | NA | 4 | C |
| Ex. 15 | AL-PET 9-100 | Al 9/ PET 100 | E05R1020 | 120 | 6 | B |
| Ex. 16 | AL-PET 9-100 | Al 9/ PET 100 | LUMIRROR H10 | 480 | 11 | A |
| Ex. 17 | AL-PET 9-100 | Al 9/ PET 100 | E05R1020 | 120 | 5 | C |
| Ex. 18 | AL-PET 9-100 | Al 9/ PET 100 | E05R1020 | 120 | 4 | C |
| Comp. Ex. 1 | Sui-80-M30 | 35 | E05R1020 | 120 | 1 | NA |
| Comp. Ex. 2 | Sui-80-M30 | 35 | E05R1020 | 120 | 1 | D |
| Comp. Ex. 3 | AL-PET 9-100 | Al 9/ PET 100 | E05R1020 | 120 | 2 | D |
| Comp. Ex. 4 | AL-PET 9-100 | Al 9/ PET 100 | E05R1020 | 120 | 2 | D |
| Comp. Ex. 5 | AL-PET 9-100 | Al 9/ PET 100 | E05R1020 | 120 | 2 | D |

In Tables 1-1-1 through 1-2-2, the details of the product names are as follows.

<Intermediate Layer>
<<Base Material>>

LUMIRROR T60: polyethylene terephthalate, manufactured by TORAY INDUSTRIES, INC.

UPILEX 125S: polyimide, manufactured by UBE INDUSTRIES, LTD.

ULTEM1000: polyether imide, manufactured by SABIC

VERADEL A-300A: polyether sulfone, manufactured by Solvay Japan, Ltd.

TORELINA E 1380: polyphenylene sulfide, manufactured by TORAY INDUSTRIES, INC.

APTIV 2000: polyether ether ketone, manufactured by Victrex PLC

TEONEX Q51: polyethylene naphthalate, manufactured by Teijin DuPont Films Japan Limited TSE 3033: dimethyl silicone rubber, manufactured by Momentive Performance Materials Inc.

DY35-2083: dimethyl silicone rubber, manufactured by DOW CORNING TORAY CO., LTD.

KE-1300: dimethyl silicone rubber, manufactured by Shin-Etsu Chemical Co., Ltd.

XE14-C3450: phenyl silicone rubber, manufactured by Momentive Performance Materials Inc.

<<Additives>>

D0958: divinyl benzene, manufactured by Tokyo Chemical Industry Co., Ltd.

MEDAIC: methyl diallyl isocyanurate, manufactured by Shikoku Chemicals Corporation M2088: soluble fullerene, manufactured by Tokyo Chemical Industry Co., Ltd.

NS-A100: hydrogenated fullerene, manufactured by Frontier Carbon Corporation

<Electrode>

SUI-80-M30: conductive cloth, manufactured by SEIREN Co., Ltd.

AL-PET 9-100: aluminium/PET composite film, manufactured by PANAC CO., LTD.

<Spacer>

E05R1020: conductive cloth tape, manufactured by SEIWA ELECTRIC MFG CO., LTD.

LUMIRROR H10: a PET film, manufactured by TORAY INDUSTRIES, INC.

TABLE 2

| | Frequency (Hz) | | | |
|---|---|---|---|---|
| | 400 | 2,000 | 12,000 | Judgement |
| Ex. 19 | OK | OK | OK | Acceptable |
| Comp. Ex. 6 | NG | NG | NG | Not acceptable |

It was found from Examples 1 to 7 and Comparative Examples 1 and 2 that the materials including the structure represented by formula (1) below or the electron-withdrawing functional group in the skeleton of the principle chain thereof had the larger electricity generation amount.

[Chem.4]

Formula (1)

In the formula (1) above, $R_1$ is a carbonyl group, an ether group, a thioether group, or organopolysiloxane, and $R_1$ may form a cyclic structure (an imide group) with $R_2$; and $R_2$ to $R_6$ are organic groups that may be identical or different, where each of the organic groups may have a valency of 2 or more, and may form another structure.

It was found from Example 14 and Comparative Examples 3 to 5 that a large electricity generation amount was obtained without adding additives, as the phenyl silicone contains the electron-withdrawing phenyl group.

It was found from Examples 8 to 10 and Comparative Examples 3 to 5 that an electricity generation amount was improved with the dimethyl silicone rubber that did not contain an electron-withdrawing functional group, by introducing a phenyl group through co-crosslinking of the vinyl group.

It was found from Examples 11 to 13 and Comparative Examples 3 to 5 that an electricity generation amount was improved with the dimethyl silicone rubber that did not contain an electron-withdrawing functional group, by introducing isocyanurate through co-crosslinking of the allyl group.

It was found from Examples 14 to 16 that an electricity generation amount was improved by changing the height of the space with varying the thickness of the spacer.

It was found from Examples 17 and 18 and Comparative Example 3 that an electricity generation amount was also improved by adding the fullerene having the similar structure to the formula (1) to the base material.

From Example 19 and Comparative Example 6, moreover, the action of the element independent from the frequency was confirmed by applying the voltage to the element. As a result, it was found that the element of the present invention exhibited an "inverse piezoelectric effect," as the surface modification treatment had been performed.

For example, the embodiments of the present invention are as follows.

<1> An element including:
a first electrode;
an intermediate layer; and
a second electrode,
the first electrode, the intermediate layer, and the second electrode being disposed in this order,
the intermediate layer including an organic polymer material, where a molecular structure of the organic polymer material includes a structure represented by formula (1) below:

[Chem.5]

Formula (1)

where $R_1$ is a carbonyl group, an ether group, a thioether group, or organopolysiloxane, and $R_1$ may form a cyclic structure (an imide group) with $R_2$; and $R_2$ to $R_6$ are organic groups that may be identical or different, where each of the organic groups may have a valency of 2 or more and may form another structure.

<2> The element according to <1>, wherein the structure represented by the formula (1) includes an electron-withdrawing substituent.

<3> The element according to <1> or <2>, wherein a principle chain of the organic polymer material includes a siloxane bond.

<4> The element according to any one of <1> to <3>, wherein a principle chain of the organic polymer material includes the structure represented by the formula (1).

<5> The element according to any one of <1> to <3>, wherein a side chain of the organic polymer material includes the structure represented by the formula (1).

<6> The element according to any one of <1> to <3>, wherein a cross-linking agent used to bond molecules of the organic polymer material to each other includes the structure represented by the formula (1).

<7> The element according to <6>, wherein the organic polymer material includes a structure where molecules of the organic polymer material are cross-linked with each other with the structure represented by the formula (1) and a compound containing two or more allyl groups or vinyl groups.

<8> The element according to <7>, wherein the compound containing two or more allyl groups or vinyl groups includes an isocyanuric acid derivative.

<9> The element according to any one of <1> to <8>, wherein a space is disposed between the intermediate layer and the first electrode, or between the intermediate layer and the second electrode, or both.

<10> An electric generator including:
the element according to any one of <1> to <9>.

REFERENCE SIGNS LIST

1: first electrode
2: second electrode
3: intermediate layer
4: space
5: electrical wire
6: cover material
7: spacer
10: element
20: electric generator
21: electric circuit

The invention claimed is:
1. An element, comprising:
a first electrode;
an intermediate layer; and
a second electrode,
wherein
the first electrode, the intermediate layer, and the second electrode are disposed in this order,
the intermediate layer comprises an organic polymer material and is subjected to a surface modification treatment such that a proportion of Si—O bonds is increased, and
the organic polymer material comprises a structure of formula (1):

Formula (1)

where $R_1$ is organopolysiloxane and is a principal chain of the organic polymer material; and $R_2$ to $R_6$ are identical or different organic groups and are a side chain of the organic polymer material.

2. The element according to claim 1, wherein the structure of the formula (1) comprises an electron-withdrawing substituent.

3. The element according to claim 1, wherein a cross-linking agent bonding molecules of the organic polymer material to each other comprises the structure of the formula (1).

4. The element according to claim 3, wherein the organic polymer material comprises
a structure where molecules of the organic polymer material are cross-linked with each other with the structure of the formula (1) and
a compound comprising two or more allyl groups or vinyl groups.

5. The element according to claim 4, wherein the compound further comprises an isocyanuric acid derivative.

6. The element according to claim 1, wherein a space is disposed between the intermediate layer and the first electrode, or between the intermediate layer and the second electrode, or both.

7. An electric generator, comprising:
an element comprising
a first electrode;
an intermediate layer; and
a second electrode,
wherein the first electrode, the intermediate layer, and the second electrode are disposed in this order,
the intermediate layer comprises an organic polymer material and is subjected to a surface modification treatment such that a proportion of Si—O bonds is increased, and the organic polymer material comprises a structure of formula (1):

Formula (1)

where $R_1$ is organopolysiloxane, and is a principal chain of the organic polymer material; and $R_2$ to $R_6$ are identical or different organic groups and are a side chain of the organic polymer material.

8. The element according to claim 1, wherein the surface modification treatment applies radiation energy to modify the intermediate layer.

9. The element according to claim 1, wherein the surface modification treatment re-crosslinks a surface of the intermediate layer.

10. The element according to claim 1, wherein the surface modification treatment is a plasma treatment, a corona discharge treatment, a UV-ray irradiation treatment, an ozone treatment, or a radial-ray irradiation treatment.

11. The element according to claim 1, wherein the surface modification treatment is a corona discharge treatment with an applied voltage in a range of 50 to 150 V and an applied energy in a range of from 6 to 300 J/cm$^2$.

12. The element according to claim 7, wherein the surface modification treatment applies radiation energy to modify the intermediate layer.

13. The element according to claim 7, wherein the surface modification treatment re-crossliniks a surface of the intermediate layer.

14. The element according to claim 7, wherein the surface modification treatment is a plasma treatment, a corona discharge treatment, a UV-ray irradiation treatment, an ozone treatment, or a radial-ray irradiation treatment.

15. The element according to claim 7, wherein the surface modification treatment is a corona discharge treatment with an applied voltage in a range of 50 to 150 V and an applied energy in a range of from 6 to 300 J/cm$^2$.

* * * * *